United States Patent Office 3,539,356
Patented Nov. 10, 1970

3,539,356
PROCESS OF MAKING SNACK PRODUCTS
John O. Benson, Mayer, and Merle F. Peden, Minneapolis, Minn., assignors to General Mills, Inc., a corporation of Delaware
No Drawing. Filed Mar. 9, 1967, Ser. No. 621,756
Int. Cl. A23l *1/12, 1/10*
U.S. Cl. 99—100                                        17 Claims

ABSTRACT OF THE DISCLOSURE

Prepare a snack from a gelatinized farinaceous dough containing 22–32% moisture by working and shaping the dough at said moisture level into a thin piece having shear strength of at least 75 pounds, form into small pieces and deep-fat fry at the same moisture content.

---

The present invention relates to a process of preparing cereal based or farinaceous type deep-fat fried snack products, usually in the form of a chip or a similar shape in which the thickness of the snack material being deep-fat fried is relatively uniform. While the invention is applicable to a variety of products, it is particularly adapted to the production of a potato chiplike product made from either a finely divided potato product alone or a combination of such potato product with other cereals or starch materials. These preferred products may be made by developing a gelatinized dough containing the above ingredients, and working the dough to a controlled degree, after which the product is shaped and deep-fat fried.

It is therefore an object of the present invention to provide a novel process of preparing snack products. It is another object of the present invention to provide a novel process of producing potato chiplike products derived partially or entirely from potatoes through a dough working technique which permits the control over the characteristics of the final product. These and other objects of the invention will be apparent from the following description.

In general, the process involves the preparation of a gelatinized farinaceous dough containing cereal or grain components or other starchy materials, such as potatoes or sweet potatoes, all of which materials are contemplated in the term "farinaceous," working the dough while in the moisture range of about 22 to about 32%, shaping the dough into a suitable form for frying, usually in a thin web form which may be either flat or which may subsequently be formed up into any desired shape, and deep-fat frying the shaped product at a moisture content within the approximate range of 20 to 32%, preferably at a temperature within the approximate range of 340 to 400° F. for a time period of about 5 to 30 seconds.

It has been found that within the scope of the above description, it is possible to prepare a wide variety of snack products from a wide variety of starting materials such that the physical characteristics of the finished product may be controlled to have a desirable texture and desirable eating characteristics, such as mouth feel, etc. At the same time, considerable variation is possible in the ingredients so that the flavor characteristics of the product may be varied at will.

As indicated above, it is possible to prepare the dough from a wide variety of starchy or grain materials. Typical materials which may be used include corn, rice, wheat, potatoes, sweet potatoes, and the like. For a potato chip product, the starting materials would include at least some potato material, usually from 30–70% by weight, preferably 40–60%.

These farinaceous materials, either by themselves or in combination with one another and/or in combination with other minor ingredients, such as flavors, are then formed into a gelatinized dough. This may be accomplished in any of a number of ways. For example, it is possible to start with materials which have been previously gelatinized and simply mix them with water to develop the dough. As an alternative, it is possible to prepare an ungelatinized dough from water and any of the above-mentioned starting materials and then to cook the dough to gelatinize it. Other alternatives include the possibility of using some pregelatinized material in combination with other materials which are separately cooked and the two materials thus previously gelatinized are mixed to form a dough. Regardless of the particular method by which the gelatinized dough is prepared, the degree to which the dough is worked will have a significant effect on the characteristics of the finished products.

The dough should contain between about 22 and about 32% water at the time it is subjected to the working step. This moisture content may be arrived at by a variety of methods, taking into account the numerous variations which are possible in the method by which the gelatinized dough is made. For example, this moisture level may be obtained by simply mixing this amount of moisture in with the ungelatinized raw material and cooking the dough without any substantial loss of moisture. Another possibility is to start with a higher moisture content dough and to allow part of the moisture to evaporate during the cooking step, as for example, when cooking is accomplished at atmospheric pressure. Other possibilities include, for example, cooking corn grits in the presence of a considerable amount of water and then mixing the cooked corn grits at an elevated moisture level with sufficient dry potato flour or dehydrated mashed potatoes, which have previously been cooked such that the overall moisture content of the resultant dough is within the range described. Other methods of arriving at this ultimate moisture level will be evident from the examples.

As previously described, the dough thus prepared is subjected to a working step either prior to or in combination with the shaping step in order to develop certain characteristics in the dough and subsequently in the finished product. The amount of working may be relatively slight and the final product obtained will resemble potato chips made from sliced fresh potatoes and will have an eating characteristic which can be best described as flinty. By increasing the amount of working, however, it is possible to materially change the nature of the finished product such that it is tender and fluffy and substantially larger in volume, having expanded considerably in the frying operation. By increasing the working still further, the product finally obtained is still different in character, becoming lighter and more puffed or expanded. Sometimes, however, these products become so light and tender that they have little mechanical strength and therefore tend to crumble unduly during handling.

One group of products of the present invention are those which have been worked in the dough stage to a considerable degree such that the final fried product has lost most of its flinty character and yet is not so light and fragile that it cannot be satisfactorily handled, packed and shipped. These doughs are the ones which have been worked to the extent that the dough possesses certain shear strength characteristics. The shear strengths described herein are expressed in terms of pounds of shear strength as measured on the Allo-Kramer shear press, model S2HE, manufactured by the Allo Precision Metals Engineering Incorporated of Rockville, Md. The shear characteristics of the dough were determined on this machine employing a 2500-pound range with speed number 8 and employing the standard cell (catalog #C–15). The dough placed in the shear press was a flat sheet of .033 thickness.

The doughs which are used for the above group of products include those which develop minimum shear strength of 75 pounds when tested on the above machine. In a great many instances, the shear strengths developed are considerably higher, in the range of 200 to 600 pounds, and indeed it is possible to work doughs until they develop shear strength up to 700 pounds while still displaying the preferred characteristics desired by the present invention.

The particular shear strength employed will depend to some extent on the type of raw materials employed. For example, with a corn-potato blend, a shear strength of at least 100 is generally employed. With a 100% potato product, higher shear strengths of 250 or more are employed. With a rice-potato blend, the shear strength of at least 200 is employed.

The shear strengths described above are those which are developed in the finished worked dough, the working including the final shaping steps. The working applied to the dough may include the working accomplished during the cooking of the dough and during the subsequent working of the dough after cooking on up to and including the shaping step. For example, it is possible to subject the dough to an extrusion step to form filaments or pellets which are further subjected to a sheeting operation in order to develop the requisite shear strength. As an alternative, it is possible to subject the dough to repeated extrusions and/or sheetings through rolls until the desired amount of working is developed. Similarly, it is possible to work various portions of the dough separately and combine them with suitable additional working until the respective portions are thoroughly combined and where the dough develops the overall shear strength described. In some instances, the working may involve the recycling of some sheeted dough from which flat chip pieces have been cut. The amount of recycling will depend on the ultimate characteristics desired but generally 25 to 75% of the sheeted dough may be recycled.

The dough worked to the extent described above is quite elastic. In addition, a thin sheet of the dough, when held up to the light, displays distinct translucence, whereas a dough which has not been worked to the same degree is quite opaque. Such an opaque dough produces final fried products having somewhat flinty characteristics.

In the course of the working and usually in the last steps thereof, the dough is shaped into a relatively thin layer, usually from about .030 to .040 thick, from which suitable sized individual pieces are cut. This formation of individual pieces may be accomplished by sheeting the dough and cutting suitable shaped pieces from the sheeted dough or it may be accomplished by extruding a solid cylinder of the dough and cutting off thin layers transversely from the cylinder or by any other suitable method. These flat pieces may be then subjected to a deep-fat frying operation in that form or they may be shaped further as, for example, by rolling them into cones or other shapes which still preserve essentially the same cross-sectional thickness of the web material such that more or less uniform deep-fat frying is obtained.

Following shaping of the pieces to the desired form, the pieces are deep-fat fried at a moisture content of approximately 20 to 32%. These moistures are essentially the same moistures as were present in the dough during the working step. Usually there may be little, if any, loss of moisture during the working step and the products can go directly from the shaping step into the deep-fat fryer. The preferred moisture level for any particular dough may vary within the above range, but generally it is preferred to fry within the approximate range of 23 to 26% moisture for most products.

The temperature of the fat is usually maintained within the range of 340 to 400° F., preferably about 360 to 380° F. The time period for frying may vary from 5 to 30 seconds, and preferably is from 8 to 16 seconds. The shorter time periods are generally employed with the higher temperatures and the longer time period is with the lower temperatures. The control of both the temperature and the time will depend on the particular ingredients employed and to some extent on the color and other texture characteristics desired in the finished product. In general it has been found that the amount of oil absorbed by the chips decreases with an increase in the shear strength of the dough.

The following examples will serve to illustrate the invention.

EXAMPLE 1

A mix was made of 96.7% rice flour and 3.3% salt. This mix was then cooked with water in the ratio of 68% mix and 32% water. The dough was cooked in a pressure cooker equipped with paddle agitators which thoroughly worked the dough while it was being cooked. The cooked rice dough was then extruded through holes about ⅛ of an inch in diameter and cut into pellets of 1/16 to ⅛ inch length. These pellets were fed to a mixer where they were mixed with dehydrated cooked mashed potatoes and water. The relative amounts of materials employed were as follows:

| | Percent |
|---|---|
| Rice pellets | 26.6 |
| Dehydrated mashed potatoes | 55.0 |
| Water | 18.4 |

Taking into account the amount of moisture in the rice pellets, the overall moisture content of the mixture was approximately 32% moisture. This mixture was fed through a meat chopper to intimately blend and press the ingredients together and put them into a loose granular form. This granular material was then fed through sheeting rolls to form a sheet of uniform thickness about .030 of an inch, from which chips of a generally elliptical shape were cut. These chips were immediately deep-fat fried at about 32% moisture in coconut oil at a temperature of about 395° F. for a period of 15 to 20 seconds. The product discharged from the fryer had a moisture content of 2 to 3% and was then salted to taste.

The product resembled a potato chip in appearance and taste and yet had a texture which was considerably more tender and less flinty than that found in the usual potato chip. Moreover, since the product contains rice flour which is less expensive than dehydrated mashed potatoes, it will be evident that the product is more economical to make than a comparable product made entirely from dehydrated mashed potatoes. In addition, products of this type whether made in whole or in part from dehydrated mashed potatoes possess advantages in texture and uniformity as compared with potato chips made from sliced fresh potatoes.

In this example, the remainder of the sheeted dough which was left after the elliptical chips were cut from the sheet was recycled back to the sheeting rolls in a continuous operation. This served to contribute additional working to the dough and developed part of the shear strength.

EXAMPLE 2

25 pounds of corn grits were tempered for 45 minutes with 4 pounds of water. The following formulation was then cooked for one hour in a rotary batch cooker.

25 pounds of corn grits (tempered)
3 pounds of water
½ pound sugar
¼ pound salt

The cooked product was then blended with dehydrated mashed potato flakes in the following proportions:

2½ pounds cooked corn
2½ pounds dehydrated cooked mashed potato flakes
¾ pound water Because of the water in the cooked corn grits, the overall mixture had a water content of approximately 22%. The mixture was then formed into a dough and subsequently sheeted between two rolls, one smooth and the other corrugated, such that a sheet was obtained having an overall thickness of .038 which was corrugated on one side and smooth on the other. Chips were cut from this sheet and were deep-fat fried in coconut oil at temperatures within the range of 360 to 380° F. for a time of from 10 to 25 seconds. The chips, prior to frying, had a moisture content of approximately 22%. The product obtained was a crisp, detectable potato chiplike product which had a tender and non-flinty eating characteristic.

EXAMPLE 3

The following formulation was cooked in a batch cooker 7 pounds corn flour
5 ounces salt
10 ounces sugar
4 pounds water The jacket on the cooker was held at 20 pounds per square inch steam pressure for 45 minutes. After this period of time, the cover was removed from the cooker and 7 pounds of dehydrated cooked mashed potatoes were blended in with the cooked corn. Sufficient water was added to bring the moisture level up to approximately 25%. The dough obtained by blending in these ingredients was removed from the cooker and sheeted to about .038 of an inch thickness through a set of rolls, one of which was smooth and the other corrugated. The sheet was cut into chips and the product fried in coconut oil at 360 to 380° F. for a period of approximately 10 seconds.

EXAMPLE 4

In this example, a dried precooked corn flour made from grits was prepared as a staple from which snacks could be prepared at any time. The precooked corn flour was prepared as follows: Corn grits were cooked in an open kettle in the presence of excess boiling water for 60 to 75 minutes. Following the cooking, the mixture was quenched in cold water. The grits were then drained, washed and dried to between 6 and 9% moisture. The dried grits were ground to produce a ground cooked corn flour.

In preparing the snack, the ground precooked corn was blended with dehydrated cooked mashed potato granules, salt and water in the following proportions:

| | Percent |
|---|---|
| Corn | 33.8 |
| Potato granules | 41.2 |
| Salt | 1.1 |
| Water | 23.9 |

The mixture had an overall moisture content of about 25%. The blended ingredients were then sheeted through heavy rolls, one smooth and one corrugated, to produce a sheet of about .032 to .034 of an inch thickness. Chips were cut from the sheet into elliptical form, leaving a scrap web which was recycled through the sheeting rolls. Sufficient of the web was recycled so that there was enough overall working in the recycle and in the original sheeting to develop suitable end characteristics. It was found that, in general, 45% or more of the sheeted dough should be recycled in order to accomplish this degree of shear strength.

The cut chips had a moisture level of about 25%. They were fried in vegetable oil at 370° F. for between 7 and 10 seconds to reduce the moisture level below 2½% in the final product. The drained chips were then salted with from 1 to 1½% salt by weight.

EXAMPLE 5

In this example, corn grits cooked, dried and ground as described in Example 4 were employed as one of the starting materials. The other starting material was dehydrated cooked mashed potatoes in the form of potato granules. A series of products were made, either entirely from the corn, entirely from the potato granules or from a mixture thereof. Where a mixture was employed, it was composed of 45 parts by weight of corn and 55 parts by weight of potato granules. The corn had a moisture content of 7% and the potato granules 8%. In each instance, sufficient water was added to achieve the desired moisture level. With the above products, 23.5 parts of water was needed in order to achieve an overall moisture level of 25%, 27.0 parts of water to achieve a moisture level of 27% and 32.5 parts of water to achieve an overall moisture level of 30%.

These ingredients were then blended and sheeted through heavy rolls (1 smooth and 1 corrugated). The sheet thickness obtained was between 0.032 and 0.034 inch. In some instances, the dough was not recycled at all and in other instances, part of the dough was recycled.

A sheet from the rolls was passed through a cutter die which cuts elliptical pieces. These pieces or chips were then fried in vegetable oil at 370° F. for between 5 and 15 seconds or for sufficient time to reduce the moisture level below 2½% in the final product. In each instance, about 1½% of salt was employed in the original dough and the final chips were salted with from 1 to 1½% salt by weight. In most instances, there was a slight loss of moisture between the original moisture and the moisture at the time that the product was fried. In general, however, this loss of moisture did not amount to more than 5% of the total weight of the product.

The results obtained are indicated in the following table. In general, the products made from a combination of potato and corn displayed some flinty characteristics at shear stresses below about 200 pounds. The products prepared from corn alone likewise displayed some flinty characteristics below about 200 pounds shear strength in the dough. The products prepared from potato alone showed some flinty characteristics at shear strengths below about 250. While these products made at these

TABLE

| | Composition | Sheet thickness | Moisture of dough, percent | Percent recycle | Shear strength | Character of product |
|---|---|---|---|---|---|---|
| 1 | Potato-corn | .032-.034 | 27 | 67 | 227 | Tender. |
| 2 | do | .032-.034 | 27 | 0 | 119 | Slightly flinty. |
| 3 | do | .032-.034 | 27 | 67 | 259 | Tender. |
| 4 | do | .032-.034 | 27 | 0 | 115 | Slightly flinty. |
| 5 | do | .032-.034 | 27 | 0 | 113 | Do. |
| 6 | do | .032-.034 | 27 | 67 | 273 | Tender. |
| 7 | do | .032-.034 | 27 | 0 | 130 | Slightly flinty. |
| 8 | do | .032-.034 | 27 | 0 | 123 | Do. |
| 9 | do | .032-.034 | 27 | 0 | 110 | Do. |
| 10 | do | .032-.034 | 27 | 67 | 240 | Tender. |
| 11 | Corn | .032 | 27 | 0 | 151 | Slightly flinty. |
| 12 | do | .032 | 27 | 67 | 254 | Tender. |
| 13 | Potato | .035 | 27 | 0 | 212 | Slightly flinty. |
| 14 | do | .035 | 27 | 67 | 364 | Tender. |
| 15 | Potato-corn | .032-.034 | 27 | 67 | 177 | Do. |
| 16 | Corn | .032-.034 | 27 | 67 | 201 | Do. |
| 17 | Potato | .032-.034 | 27 | 67 | 234 | Do. |
| 18 | Potato-corn | .032-.034 | 30 | 67 | 77 | Do. |
| 19 | do | .032-.034 | 30 | 0 | 55 | Slightly flinty. | lower shear strengths are not preferred when one is attempting to produce a product without flinty characteristics, these products still are delectable and suitable snacks and, in some respects, thus resemble a potato chip prepared from fresh sliced potatoes. The table also shows that under some circumstances such as at the higher moisture levels it is possible to avoid flintiness in the finished product.

The embodiments of the invention in which an exclusive property or privilege is claimed are defined as follows:

1. Process for producing a snack product which comprises preparing a substantially completely gelatinized farinaceous dough containing from about 22–32% moisture, working and shaping the dough at substantially said moisture level into the form of a relatively thin piece having a shear strength of at least 75 pounds, forming said thin piece into a number of smaller pieces having a desired shape and size, and deep-fat frying the pieces in oil, the pieces having a moisture content within the range of about 20–32% at the time they are subjected to the frying operation.

2. Process according to claim 1 in which the frying is accomplished at a temperature of from 340 to 400° F. for a period of from 5 to 30 seconds.

3. Process according to claim 1 in which the frying is accomplished at a temperature of from 360 to 380° F. for a period of from 8 to 16 seconds and the moisture content of the pieces at the time of frying is approximately 23 to 26%.

4. Process according to claim 1 in which the farinaceous material is a combination of potato and other farinaceous materials.

5. Process according to claim 1 in which the product is partially derived from potatoes and partialy derived from rice.

6. Process according to claim 1 in which the dough prior to frying has a shear strength in the range of 200–600 pounds.

7. Process according to claim 1 in which the dough is shaped by sheeting, pieces are cut from the sheeted dough and are subjected to the deep-fat frying.

8. Process according to claim 7 in which scrap pieces of dough left from the cutting operation are recycled to the dough working operation.

9. Process according to claim 8 in which the proportion of the sheeted dough which is recycled is in the range of 25 to 75%.

10. Process according to claim 7 in which the dough pieces are rolled prior to frying.

11. Process according to claim 1 in which the farinaceous material is at least partially derived from potatoes.

12. Process according to claim 11 in which the potato material constitutes from 30–70% of the product.

13. Process according to claim 1 in which the product is partially derived from potatoes and partialy derived from corn.

14. Process according to claim 13 in which the corn is cooked separately and is then mixed with dehydrated cooked mashed ptatoes.

15. Process according to claim 13 in which the corn is in the form of corn grits.

16. Process according to claim 13 in which the corn is in the form of corn flour.

17. Product made according to the process of claim 1.

References Cited

UNITED STATES PATENTS

| 2,665,208 | 1/1954 | Spieser | 99—1 |
| 3,076,711 | 2/1963 | Gerkens | 99—100 |
| 3,150,978 | 9/1964 | Campfield | 99—1 |
| 3,297,450 | 1/1967 | Loska | 99—100 |
| 3,361,573 | 1/1968 | Reinertsen | 99—83 |

A. LOUIS MONACELL, Primary Examiner

W. A. SIMONS, Assistant Examiner

U.S. Cl. X.R.

99—80, 83